Patented May 15, 1951

2,553,497

UNITED STATES PATENT OFFICE 2,553,497

HEMOSTATIC COMPOSITION OF THROMBIN AND GLYCOCOLL

Georges Louis Auguste Crut, Paris, France, assignor to Societe de L'Institut de Serotherapie Hemopoietique, Paris, France, a French company No Drawing. Application July 31, 1947, Serial No. 765,246. In France February 4, 1946

Section 1, Public Law 690, August 8, 1946

Patent expires February 4, 1966

2 Claims. (Cl. 167—65)

It is known that some of the drugs used for haemostase in general, in particular those containing thrombokinase or cytozyme, indirectly cause coagulation of the blood. This requires the presence of calcium and of prothrombin in order to produce thrombin (fibrin ferment), which is the final stage of the coagulation of fibrinogen and blood. Other drugs containing snake venoms have also been proposed for local haemostase, but these drugs are more closely related to thrombokinase than to thrombin, and furthermore they contain foreign substances (neurotoxins, haemolysins, etc.) which make them unsuitable for parenteral use (owing to the danger of intravascular coagulation, etc.).

Now, applicant discovered that it is possible to prepare a product mainly comprising thrombin (fibrin ferment) which is suitable for use, either for local haemostase, or for oral or parenteral administration, and more particularly for intramuscular injection, by fixing thrombin, extracted from the blood of domestic mammals, on an appropriate support, fulfilling the following conditions: it should be soluble in salt water, but unsoluble in and unaffected by alcohol, acetone and other organic liquids whereby such liquids will precipitate thrombin; said support should be able to absorb thrombin with a fairly labile bond, so that, after precipitation of thrombin by the organic liquid above referred to, thrombin will be slowly set free and will neutralize the action of anti-thrombins in the blood, which delay coagulation of same; finally the support should be harmless to the organism, for parenteral injection.

Any materials possessing these properties, and in particular certain amino-acids, like glycocoll, may be used for this purpose and will enable the thrombin to be preserved in the form of a very water-soluble powder.

The process according to the invention comprises adding to a freshly prepared solution of thrombin, at ordinary temperature, a certain percentage of a support which fulfils the above conditions, and precipitating the thrombin-support complex with alcohol, acetone or any other suitable organic liquid.

The solution is allowed to settle in a refrigerator, the precipitate is drained on a Büchner filter and dried in vacuo. A complex mixture is thus obtained in the form of a powder containing a small percentage of thrombin, the remainder being formed by the support in question.

The product thus obtained has the following advantages:

1. Possibility of stabilizing the activity of the thrombin and of ensuring its preservation;

2. Possibility of measuring the thrombin in the powder thus defined by dosing with fibrinogen and of thereby obtaining a medicinal product containing a given number of Upjohn or other international units of thrombin;

3. Use for haemostase in general and, in particular, for neuro-surgery;

4. Use by way of the mouth, by parenteral administration and, in particular, by intramuscular injection, which is very important when it is required to operate on patients whose coagulation time is abnormally long, in which case the present known drugs have been found unsatisfactory.

The example given hereinafter illustrates a method of carrying out the invention, but is in no way of a limitative character.

Example

The thrombin obtained from 5 litres of blood plasma is dissolved in about 350 to 550 cc. of water containing .3% by weight of sodium hydrochloride. 5% by weight of glycocoll is added thereto at ordinary temperature, the mixture is cooled to 0° C. or below and precipitation is effected with two volumes of acetone. The solution is allowed to settle in a refrigerator, the precipitate is drained on a Büchner filter and dried in vacuo. 15 to 20 g. of a powder containing about 2% of thrombin are thus obtained, the remainder comprising glycocoll.

Having now described my invention what I claim as new and desire to secure by Letters Patent is:

1. A hemostatic composition consisting of powder containing thrombin and glycocoll as a support therefor.

2. A process of preparing a hemostatic composition which comprises recovering thrombin from blood plasma, dissolving said thrombin in salt water, adding glycocoll, cooling the solution, precipitating both thrombin and glycocoll with an organic liquid, allowing to settle in the cold, draining and drying in vacuo.

GEORGES LOUIS AUGUSTE CRUT.

REFERENCES CITED

The following references are of record in the file of this patent:

UNITED STATES PATENTS

| Number | Name | Date |
|---|---|---|
| 2,050,558 | Bockmuhl et al. | Aug. 11, 1936 |
| 2,162,863 | Ripke et al. | June 30, 1939 |
| 2,166,074 | Reichel | July 11, 1939 |
| 2,433,299 | Seegers | Dec. 23, 1947 |

OTHER REFERENCES

Seegers: Archives of Biochemistry, vol. 3, No. 3, Feb. 1944, pages 363–367. (Copy 167—65.5.)

Mathews: Physiological Chemistry, 2nd ed., N. Y., 1916, William Wood & Co., page 129. (Copy in Div. 43.)

Pilcher et al.: Squibb Abst. Bull., vol. 18, page 1272 (October 1945). (Copy in Div. 43.)